Oct. 3, 1944.  A. D. KRUGLER  2,359,523
FLUID PRESSURE REGULATOR
Filed Jan. 3, 1942
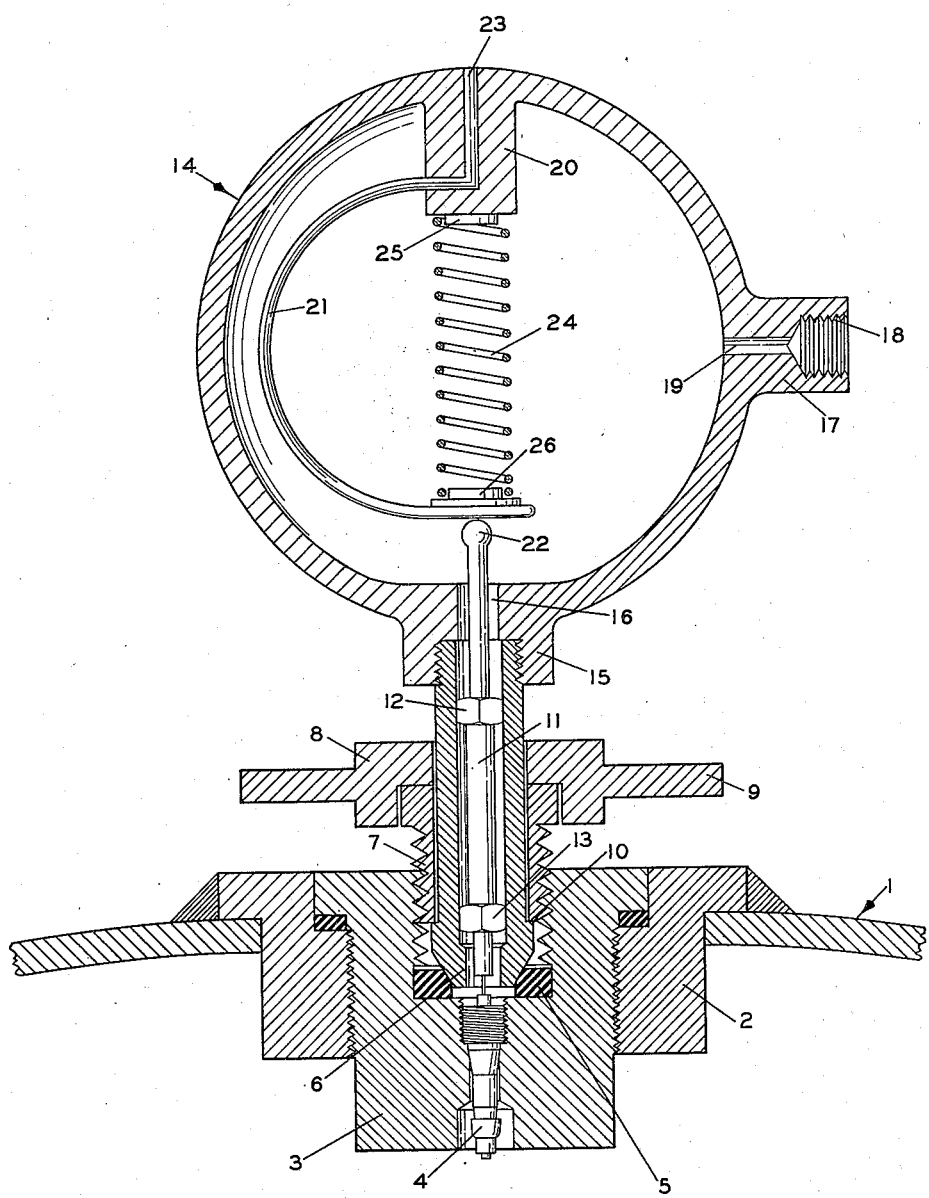
INVENTOR
A. D. KRUGLER
BY
ATTORNEY Patented Oct. 3, 1944

2,359,523

UNITED STATES PATENT OFFICE 2,359,523

FLUID PRESSURE REGULATOR

Allen D. Krugler, Bartlesville, Okla., assignor to Phillips Petroleum Company, a corporation of Delaware Application January 3, 1942, Serial No. 425,559

3 Claims. (Cl. 50—23)

My invention relates to a pressure regulator for use in a liquefied petroleum gas dispensing system, in which a metal Bourdon tube is employed as the pressure responsive element.

There are many different systems on the market which are for the purpose of dispensing liquefied petroleum gases for domestic and industrial purposes. Whether the gas is to be used as furnace fuel, cooking fuel, or for operation of internal combustion engines, it is in practically every case passed through one or more pressure regulators. In some cases, one single regulator serves to reduce the pressure from fuel tank pressure to the desired utilization pressure; in other cases this reduction is accomplished in two or more stages of reduction, depending upon what degree of constancy is desired in the final pressure condition.

Due to the many different conditions and applications to which liquefied petroleum gases have been adapted, many different regulators have been developed for the various cases. Likewise, many different styles of regulator have been devised for each of the more common applications, among which the distribution and control of propane or butane for consumption in home gas appliances are very prominent.

In practically all regulators designed for the above services, diaphragms of rubber or synthetic rubber in combination with a woven fabric have been relied upon for the pressure responsive element. While such diaphragms are well suited from the standpoint of flexibility in low pressure applications, they nevertheless are subject to many ill effects, and are a considerable source of trouble and service expense. They are also potential sources of hazard in many cases.

It is well known that rubber is subject to deterioration from many causes, chief among which are the effects of heat, sunlight, blooming of the vulcanizing element (usually sulphur) upon protracted exposure to the air, and the solvent and swelling actions of liquid hydrocarbons and their condensed vapors. Synthetic rubbers are in general subject to the same causes of deterioration, although they are more resistant to swelling than are natural gum rubber compounds.

Regardless of the many ways in which rubber diaphragms are vulnerable to deteriorating influences, they present a further problem in the matter of securing them to the adjacent structure. It is not practical to attach them to the metal parts by vulcanization, for this would present the same objectionable situation that would exist if the pneumatic tire casings and tubes were vulcanized to the wheels of an automobile. Therefore, a demountable attachment is obviously required which entails the use of many flange bolts or some other cumbersome means of attachment.

Being a substantial and non-deteriorating metal part, the Bourdon tube which I prefer to use in place of a diaphragm may be permanently attached to the regulator body by a simple silver soldering (or similar) operation. This simplified method of attachment has a further advantage in that the use of stamped sheet metal regulator bodies is made feasible, whereas good design practice requires the use of sand castings or die castings when rubber diaphragms are employed.

Others have devised regulators in which Bourdon tubes are employed. These all differ from my invention in that they require the use of packing glands or the equivalent thereof. My structure, in contrast, is completely self-enclosing, and in no case is a working part so disposed that packing boxes or plug type stop-cocks are relied upon to prevent escape of inflammable gases to the atmosphere.

The following objects and advantages will be readily understood from the above considerations and from perusal of the attached drawing, the single figure of which is a sectional view of the device.

A primary object of this invention is to provide a pressure regulator which is composed entirely of metal parts.

It is also an object to provide means of pressure regulation which involves an absolute minimum of working parts.

A further object is to provide a gas regulator which may be easily and permanently assembled, thus affording a reduction in the cost and complication of structure as compared with a demountable arrangement.

Another object is to incorporate all of the above advantageous features in a regulator which contains no stuffing boxes or other exposed joints which would be vulnerable from the standpoint of leakage.

It is also an object to provide all of the above advantages in a regulator which contains no valve within it; the regulator per se cooperates with the supply cylinder in such a manner that one single valve is employed both as the cylinder closure and the pressure regulating valve.

This device enjoys a further advantage in its adaptability to many types of body constructions, including ferrous or non-ferrous sand castings, zinc or aluminum die-castings, sheet metal stampings, or even molded plastics.

These advantages and others will be borne out in the following descriptions of the structure and its operation.

In the drawing, the numeral 1 indicates generally a fragmentary portion of a liquefied petroleum gas cylinder, in which is fitted a steel boss 2. In threaded engagement with the boss is a removable valve plug 3, bearing a valve 4, which may be of the tire valve inside type. Other valves and accessories (such as a fuse plug) are ordinarily contained in the plug 3, but are not shown here for the reason that they have no direct bearing on the present application. The plug 3 is provided with an undercut to retain a resilient gasket 5 against which a connector nipple 6 is held in sealing contact by means of a connector nut 7. A permanent handwheel 8 is ordinarily provided to turn the nut 7, leverage for the operator's fingers being afforded by projecting integral spokes 9. It should be understood that the connector nut 7 is free to rotate on the nipple 6, but when screwed into the plug 3, the nipple nose is forced against the gasket by virtue of the nut bearing on the nipple shoulder at the surface 10. A pushpin 11 bears upon the stem of the valve 4, and is provided with square shoulders 12 and 13 which serve to guide the pushpin within the bore of the connector nipple and at the same time permit passage of gas therethrough.

The body of my improved regulator is indicated in section generally by the numeral 14 which may be cylindrical in shape similar to a pressure gage in contour. A boss 15 is internally threaded to receive the upper end of the connector nipple, and is counterbored to provide a passage 16. This passage is of sufficient size to accommodate the upper end of the pushpin, and still allow sufficient annular area around the latter for free flow of gas. Another boss 17 is formed on the side of the regulator body and this serves as an outlet connection, appropriate internal threads 18 and an egress channel 19 being provided.

Inside the top of the regulator body is formed an anchor block 20 in which is secured by silver solder or the equivalent a manometric or Bourdon tube 21. The tube 21 is formed of resilient metal or similar material of sufficient flexibility as to be expanded and contracted by slight pressure changes within the regulator chamber 14. The free end of this tube bears upon a ball 22 formed on the top of the pushpin. A vent channel 23 communicates the interior of the Bourdon tube to the atmosphere. A compression spring 24 is located so as to extend the tube 21, resulting in a depression of the pushpin 11 against the stem of the valve 4. The upper and lower ends of the spring 24 are held in the desired position by means of the retaining members 25 and 26.

In operation, the user of my invention will at some time connect the regulator to a cylinder of fuel. To do this, it is only necessary to thread the connector nut 7 into the cylinder valve plug 3 by means of the handwheel 8. The spokes 9 are of a length to provide ample leverage for easily seating the nipple 6 against the gasket 5, thus making a gas-tight seal at that point. It will be noted that this gasket is in no sense a packing gland, there being no operative parts in conjunction therewith. But for a matter of convenience, the nipple 6 and the valve plug or adapter 3 could just as well be fitted with a male and a female pipe thread, respectively, without in any way interfering with movement of the operative mechanism.

Having inserted the connector nipple in the cylinder opening, the user has no further part in the operation of the regulator. The pushpin 11 is now in contact with the stem of the valve 4, which latter member is preferably a simple tire valve core, having a resilient seat which is normally closed by an internal compression spring. Valves of this type are widely marketed and are known as tire core valves. The spring 24 being substantially stronger than the valve core spring, will cause opening of the valve core immediately by means of the thrust exerted through the pushpin 11.

Gas under pressure now flows into the regulator body by way of the connector nipple. This pressure immediately begins to contract the Bourdon tube 21 against the loading imposed by the spring 24. The interior of the Bourdon tube is vented to the atmosphere through the channel 23 so that the deflection of the tube will vary with the superatmospheric pressure imposed on its outer surface in a well known manner. As this pressure continues to contract the tube, a point will be reached where the Bourdon tube no longer exerts force on the top of the pushpin in which condition the valve 4 will be closed by its own spring (not shown).

The system of forces is now in equilibrium, and no further flow or change of pressure will occur in the system so far defined until gas is withdrawn through the outlet. This would be brought about by placing in operation one of the appliances in the service line which the regulator is to feed. As soon as withdrawal through the outlet begins, the pressure within the regulator body falls slightly, and the spring 24 will be allowed to extend slightly, opening the valve 4 sufficiently to pass the required amount of gas. At any constant flow rate a new condition of equilibrium will be reached, and the regulator will thereafter maintain a constant outlet pressure as long as that particular rate of flow is maintained.

In brief, the device herein disclosed will operate in accordance with the flow and pressure characteristics of a conventional direct-acting gas regulator. The principles and manner of operation of these devices are well known to those who are familiar with or skilled in the art.

Two refinements in construction of the member 11 have been illustrated in the drawing. The first of these refinements is the pair of guides indicated by the numerals 12 and 13. These guides serve to align the pushpin in concentric relationship with all related parts. The lower one of the pair serves the additional purpose of preventing the pushpin from falling out the end of the nipple 6 when the latter is withdrawn from the cylinder valve plug.

The second of these refinements, namely, the ball 22, simply exemplifies one of many possible ways in which contact may be established between the pushpin and Bourdon tube without incurring friction, excessive wear, or excessive bearing loads on either of the contact surfaces. It is recognized that the end of the Bourdon tube will move in an arc and that the contact with the pushpin will, therefore, be a sliding one. Any construction which would minimize the effect of wear or other damage to the parts due to sliding contact between them would serve in place of the ball.

It is to be understood that the pushpin guides 12 and 13, and the ball 22 are not necessary adjuncts to my invention. Neither do I limit the regulator proper to the specific form shown. The materials of construction and the shape or manner of construction of the various parts as such are of minor importance in defining the scope of my invention.

What I claim and desire to secure by Letters Patent is the novel arrangement of the principal parts of the above described device. A distinct advantage lies in the fact that the force transmitting member which communicates motion from the Bourdon tube to the valve is completely contained within one of the continuous and principal conduits of the system. The pressure responsive tubular member is contained within the confines of the pressure system and disposed to directly control the regulator valve. By virtue of this arrangement no opportunity for leakage to the atmosphere is permitted, nor is any moving part directly exposed to dirt, moisture or any undesirable content of the outside atmosphere. To the best of my knowledge, this situation is not provided for in any Bourdon tube type reducing valve or regulator heretofore conceived.

I claim:

1. A pressure regulator for the outlet of a liquid petroleum gas container comprising in combination a housing formed with an enlarged chamber, an inlet conduit secured to and communicating between said outlet and said chamber, an outlet conduit formed in said housing and communicating with said chamber, a valve in said inlet conduit, said valve including a valve stem normally biased outwardly to close said valve, and means to overcome said bias and open said valve comprising a curved pressure responsive resilient tube disposed in said chamber and having an open end secured to the housing directly opposite the valve stem, said open end communicating with the atmosphere, the opposite closed end of said tube being directly over said valve stem, an operating member between said valve stem and the closed end of said tube for transmitting pressure from said tube to overcome said bias and open said valve, and a compression spring mounted in line with the end portions of the tube and urging the closed end of the tube away from the open end of the tube to aid in overcoming said bias.

2. A device to provide a regulated pressure above atmospheric, comprising in combination a housing having a chamber to be maintained at the regulated pressure, valve means movable to open and admit pressure fluid to the chamber, and a fluid pressure motor to move and open said valve in response to the pressure above atmospheric in the chamber comprising a curved pressure responsive resilient tube disposed in a half circle having an open end secured to the housing and communicating with the atmosphere, the opposite closed end being disposed and adapted to move and open said valve, and a helical compression spring mounted in line with the end portions of the tube and urging the closed end of the tube away from the open end of the tube to bias the ends of the tube away from each other to aid in moving and opening said valve.

3. For use with a liquefied petroleum gas container having a thrust-operated outlet tire core type valve in one wall thereof, a fluid pressure motor for operating the valve comprising in combination a housing, an inlet and an outlet connection formed in the housing, a connector nipple for placing said inlet in pressure-tight communication with said thrust-operated valve, a pushpin concentrically disposed within said nipple to engage said valve, a curved pressure responsive tubular member within the housing having an open end secured in a wall of the housing at a point substantially axial with respect to the pushpin and communicating with the atmosphere, the opposite closed end of said tubular member engaging said pushpin and compression spring means mounted in said housing between and in line with the open and closed ends of the tubular member urging said ends apart and thereby urging the valve open.

ALLEN D. KRUGLER.